March 21, 1967  F. H. SURKS  3,309,982
COOKING APPARATUS
Filed Dec. 15, 1964
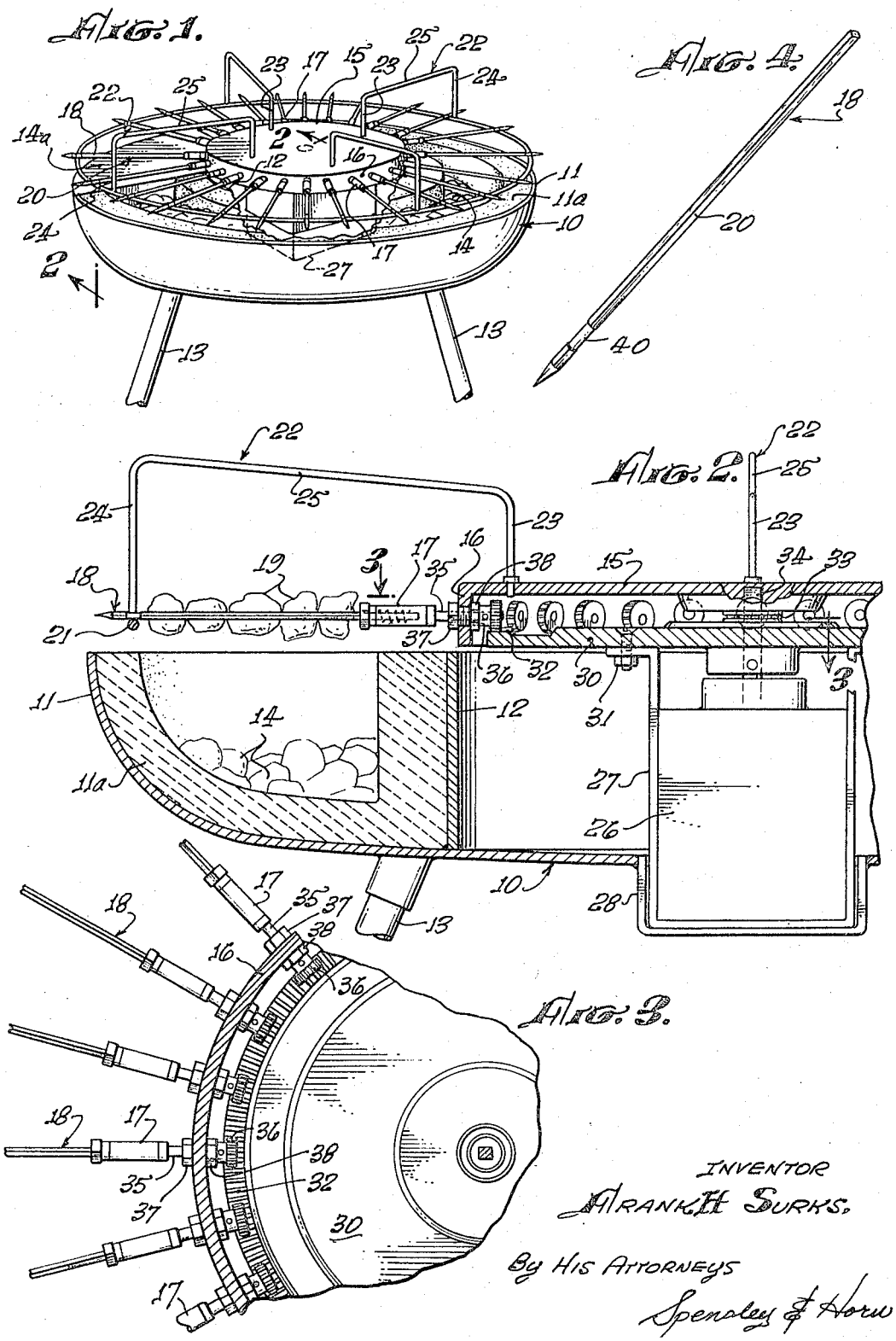

United States Patent Office 3,309,982
Patented Mar. 21, 1967

3,309,982
COOKING APPARATUS
Frank H. Surks, 824 N. Stanley,
Los Angeles, Calif. 90046
Filed Dec. 15, 1964, Ser. No. 418,475
9 Claims. (Cl. 99—420)

This invention relates to cooking apparatus and more particularly to an improved cooking apparatus of the broiler type adapted to position a plurality of food carrying skewers over an annular firebed at a selected rate.

In the culinary arts, many conventional cooking devices and apparatus have been employed for subjecting prepared foods to heating so that the food will be properly cooked to satisfy a variety of eating tastes. In some instances, particularly when the cooking of meats are involved, the food requires a relatively thorough heating procedure to assure that the food is cooked not only on the outer surface thereof but that the center or middle portion of the food is properly cooked. One manner of providing a thorough heating procedure encompasses means for rotating a plurality of food carrying spits about their own axes as well as for rotating the spits horizontally about a central vertical axis over a heated area. Thereby, a particular surface or side of the food is progressively arranged to face the heating area as the spits are individually rotated on their own axes while the food on the plurality of spits continuously rotates horizontally about the central vertical axis over the heating area.

Difficulties have been encountered when employing such conventional cooking apparatus in that a large quantity of skewers or spits cannot be readily accommodated so that the individual skewer or spit may be conveniently installed on or removed from the apparatus. It is important that the skewers be so located with relation to each other that heat be permitted to adequately pass between the adjacent skewers so that the heat is evenly distributed about each and every skewer of the plurality. The installation and removal of the skewers sometimes is difficult since other portions of the cooking apparatus structure interfere with the proper handling of the skewers so that food carried on the skewers is sometimes knocked off or becomes contaminated by encounter with the surrounding structure of the apparatus. Furthermore, conventional fireboxes used in broiler type cooking apparatus do not always adequately control the heat radiating from fuel, such as coals or charcoal or the like, contained in the firebox so that radiant heat travels into sensitive areas of the apparatus such as the motor, motor housing or in some instances, movable parts. Thus, the structure in these sensitive areas becomes fatigued and rapidly rendered inoperative. Inasmuch as cooking of foods is related to the heating procedure dependent upon individual tastes, it has been found desirable to employ some type of timing means or system to indicate the length of time that the food has been subjected to the heating process. Timers and other apparatus currently being employed are relatively expensive and are not particularly related to the individual food carrying skewers so that proper and adequate control over cooking is accomplished.

These difficulties are overcome in accordance with the present invention wherein an improved cooking apparatus is provided which includes a revolving hub having a plurality of skewer receptacles extending from the outer periphery thereof for receiving one end of each of the skewers so that the skewers are rotatably projected over an annular firebed. The opposite end of the skewers to their ends installed in the receptacle are placed on a hanger arrangement which is suspended from the hub over the firebed. In this fashion, the foods carried on the skewers are located directly over the firebed heating area and are not obstructed by grills or skewer mounting bars or brackets. Inasmuch as the skewers are merely placed on a hanger arrangement, simplicity of construction is evident and easy installation and removal of the skewers assured. A feature of the invention also resides in the employment of a stationary ring gear located within the rotating hub and a plurality of spur gears coupled to the receptacles which rotatably mesh with the ring gear so that as the hub rotates, the receptacles rotate to effect rotation of each individual skewer on its own axis while the hub revolves about its central vertical axis. Motor means are employed to rotate the hub and consequently the receptacles whereby the time that a particular skewer is subjected to heating can be determined from the time that the skewer leaves its starting position until the skewer returns to the starting position upon the completion of 360° hub rotation.

Therefore, it is a primary object of the present invention to provide an improved cooking apparatus of the broiler type which provides unobstructed means for supporting a plurality of food carrying skewers over a firebed so that heat from the firebed will adequately surround the food carried by each skewer of the plurality.

Another object of the present invention is to provide a suitable mounting and holding apparatus employed in a broiler type cooking device for removably mounting a plurality of food carrying skewers so that the skewers are rotated on their individual central axes as well as being collectively revolved about a central vertical axis over the firebed to assure thorough heating of the food carried on the skewers.

Still another object of the present invention is to provide an improved cooking apparatus which provides for the adequate containment of the fuel in the firebed such that the heat radiating therefrom is directed towards the food to be cooked and that the heat from the firebed does not become concentrated towards certain sensitive equipment such as motors, bearings, gears or the like which would be adversely affected by such concentrated heat.

Still another object of the present invention is to provide an improved cooking apparatus which includes a rotatable hub from which a plurality of food carrying skewers are suspended and which extend radially outwardly over the apparatus firebox wherein the skewers are automatically rotated about their own individual central axes and at the same time are rotated together horizontally about a central vertical axis.

Another object of the present invention is to provide an improved cooking apparatus which progressively rotates food carrying skewers about their own axes while rotating the plurality in a horizontal plane about the apparatus firebox wherein the speed of horizontal rotation is controlled at a selected known rate so that the food may be cooked according to individual taste.

The unique combination afforded by the present invention for suspending the food carrying skewers over the firebed in conjunction with the rotary means for revolving the hub as well as rotating the skewers on their individual axis insures the proper cooking of the food. Other features and advantages of the present invention will become apparent from the following detailed description of a typical embodiment of the invention taken in conjunction with the accompanying drawings in which:

In the drawing:

FIGURE 1 is a perspective view of a cooking apparatus in accordance with the present invention;

FIGURE 2 is an enlarged sectional view of the cooking apparatus of FIGURE 1 taken in the direction of arrows 2—2;

FIGURE 3 is a sectional view of a portion of the cooking apparatus shown in FIGURE 2 taken in the direction of arrows 3—3; and FIGURE 4 is a perspective view of a typical skewer employed in the cooking apparatus of FIGURE 1.

Referring to the drawings, and in reference to FIGURE 1 in particular, a cooking apparatus in accordance with the present invention is shown which includes a circular base 10 which is bowl-shaped having an upturned annular outer wall 11 and an annular inner partition or wall 12.

A suitable heat resistant lining 11a such as firebrick or ceramic is positioned within the base to line the firebed or heating area such that the lining defines the interior surface of the outer wall 11 and partition wall 12. The base is conveniently supported on a tripod mount represented by a leg 13 although other mounting or supporting structure may be employed. The area of the base 10 between the outer wall 11 and the partition 12 including the lining 11a thereof is employed for holding a suitable fuel 14 used in the cooking operation such as, for example, charcoal, wood, coal, or the like which constitutes a toroidal firebed or heating area. Gas or other suitable fuel can also be employed. The relative vertical relationship of the wall or partition 12 with respect to the bottom of the base insures that heat radiating from the fuel will raise upwards through the opening into the firebed area and is directed to the region in which the food is to be cooked without unduly exposing the receptacles as described hereinafter.

Rotatably carried on the base is a circular hub 15 having a downwardly extending side wall 16 which rotatably mounts a plurality of receptacles, such as receptacle 17. The plurality of receptacles extend outwardly from the central vertical axis of the hub and are adapted to receive one end of skewer 18 for carrying food 19 so that the plurality of skewers when properly mounted in their receptacles radially extend from the central vertical axis of the hub similar to the spokes of a wheel. It should be noted that inasmuch as the receptacles are radially mounted on the hub, the receptacles are angularly disposed with respect to each other so that the skewers will also be disposed at an angle with respect to adjacent installed skewers. This arrangement provides for an adequate and unobstructive area about a food carrying portion 20 of each skewer through which radiant heat from the firebed passes. A take-off plate 14a is provided to block off a portion of the toroidal firebed area and serve as a position at which the skewers can be inserted into and removed from the receptacles.

The opposite end of each skewer to its end mounted in the rotatable receptacle is resting on an enlarged ring 21 which is supported by several hangers such as hanger 22 from the hub 15. Each hanger 22 includes a short leg portion 23 which has one end threadably secured to the hub 15 and a long leg portion 24 which has one end secured to the ring 21. Joining the upright leg portions 23 and 24 to complete the hanger assembly is a cross bar 25 which is higher in elevation at its point of connection with the long leg portion than at its connection point with the short leg portion. This arrangement provides for strengthening the hanger so that the weight of the food carrying skewers will not cause the ring 21 to cant or tilt. Inasmuch as the hangers and ring are cantilevered from the hub, rotation of the hub about its central vertical axis carries the hanger, ring and the food carrying skewers over the annular firebed in a horizontal plane.

A feature of the invention resides in the fact that the skewers may be easily inserted into the receptacles and the opposite end thereof placed on the ring without interference with the other structure of the cooking apparatus such as is encountered when employing conventional apparatus. The hangers are disposed upright and the suspended ring has a diameter which is substantially similar to the diameter of the base 10. This arrangement permits a wide cooking area into which the plurality of skewers may be placed so that the heat from the firebox can properly and adequately reach the food carried by the skewers.

By setting the speed of rotation of the hub, the rate of skewer rotary movement over the heating area may be controlled so that any particular skewer can complete 360° rotation within a given time limit. Therefore, a suitable control over the cooking of the food is achieved by first knowing what the speed of rotation is and noting the starting position for any given skewer so that upon rotation of the hub, the return of the skewer to its starting location will fall within a prescribed time limit during which the food has been cooked to desired taste.

Referring in detail in FIGURE 2, the base 10 is shown having a motor 26 arranged along the central vertical axis of the base. The motor is enclosed in a housing 27 which is mounted to the base by means of brackets 28 suitably fastened to the bottom of the base. The housing 27 serves to protect the motor from any radiant heat which may be transmitted from the surface of the annular partition or wall 12. Mounted on the motor housing 27 is a stationary ring gear 30 which is secured to the housing by means of fasteners, such as fastener 31. The securing of the stationary ring gear to the housing ties the gear to the base which prevents the ring gear from rotary movement. The ring gear is provided with a plurality of gear teeth 32 along the edge marginal region of the gear which are in close proximity to the wall 16 of the hub 15. The hub 15 is rotatably mounted or carried on the ring gear by means of a ball bearing arrangement 33 including an upper and lower race. Extending through the center of the hub 15 and the center of the ring gear 30, there is provided a square stub 34 which is secured on one end to a hub and has its other end mated with a motor driving chuck (not shown) so that operation of the motor drives the hub in rotary movement about the ring gear.

Each receptacle of the plurality includes a shaft 35 fixed to the end of the receptacle opposite to its end carrying a skewer 18 and an end which rotatably passes through the wall 16 of the hug 15 on which is mounted a spur gear, such as gear 36. Each spur gear is provided with a small collar through which a set screw is positioned to fasten the spur gear onto the end of the receptacle shaft 35. Each receptacle shaft is prevented from linear movement within its seat through the wall 16 by means of a pair of stops 37 and 38 which are secured on the shaft on opposite sides of the wall 16.

As shown more clearly in FIGURE 3, the plurality of spur gears 36 mesh with the teeth 32 of the ring gear 30 in such a fashion that as the hub rotates about its central vertical axis, the receptacles will rotate about their individual longitudinal axes via the receptacle shafts 35 and spur gears 36. The rotary action of the receptacles is transmitted to the installed food carrying skewers so that each skewer will rotate about its longitudinal axis in response to the receptacle rotation.

FIGURE 4 more clearly illustrates a typical skewer contemplated by the invention for use in the apparatus of FIGURE 1. Preferably the skewer 18 is provided with a rounded portion 40 on its outer end which rests on the ring 21. Thus, the skewer will rotate smoothly on the ring 21 without the necessity of providing guides or notches. Although the rounded portion of the skewer is shown, it is to be understood that rotation of the skewer can still be effected in the event the skewers are square or of other configuration or shape.

In actual operation, the plurality of skewers are loaded with various foods along the food carrying portion 20 of each skewer 18 so that the opposite ends of the skewer are free and unobstructed. One end of each skewer is then inserted into a receptacle 17 carried by the hub 15. Heat radiating from fuel 14 contained within the firebed area defined by wall 11 of the base and the annular partition 12 permeates about the food 19 mounted on the skewers to cook the same. When motor 26 has been activated, hub 15 will rotate about its central vertical axis via the drive stub 34. The hub will rotate on the bearing 33 around the ring gear 30 which is maintained fixed to the base via the motor housing 27 and attachment fasteners 31. As the hub rotates, the plurality of spur gears 36 connected to their respective receptacles 17 via the shaft 35 engage the teeth 32 of the ring gear which causes the spur gears to rotate. Rotating of the spur gears causes the receptacles to rotate about their longitudinal central axes so that the food carrying skewers 18 also rotate accordingly. The outer end of the skewers rotate on the supporting ring 21. Consequently, the individual skewers are rotated about their central axes normal to the central vertical axis of the base and additionally as the hub rotates, the skewers are revolved about the central vertical axis of the base in a horizontal plane above the firebed.

The length of cooking time can be determined by observing the starting position of a particular skewer such as, for example, the position of skewer 20 positioned over take-off plate 14a of the base so that upon the completion of one revolution of skewer 20, the food will have been subjected to the heat from the firebed for a sufficient length of time to cook the food according to particular taste. In some instances, a number of skewer rotations about the central vertical axis may be necessary. However, the number of revolutions can be considered a matter of choice and not one of limitation to the invention. Although charcoal or the like has been described in the illustrative embodiment gas in combination with firebrick is also satisfactory and can be piped to the fire area in any suitable manner. It is to be understood also that a smaller device or one having a lesser number of receptacles and skewers can be made and particularly adapted for home use.

While particular embodiments of the present invention have been shown and described, it will bo obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An improved cooking apparatus comprising:
    a bowl-shaped base having an annular heating area;
    a hub member rotatably mounted on said base;
    a plurality of food carrying skewers rotatably carried on said hub and being adapted to revolve over said annular heating area in a horizontal plane responsive to said hub rotation;
    a cantilevered hanger assembly carried on said hub member over said heating area for rotatably supporting each of said skewers in conjunction with said hub member;
    means operatively connecting said skewers to said base to rotate each of said skewers on its own central longitudinal axis as said hub member rotates; and
    means carried on said base for revolving said hub member.

2. The invention as defined in claim 1 wherein each of said skewers has a rounded portion on one end rotatably engageable with said hanger assembly.

3. An improved cooking apparatus comprising:
    an annular hollow base;
    a circular wall secured in said base;
    an annular firebed disposed adjacent the periphery of said circular wall;
    a ring gear secured to said base within said circular wall;
    a hub member rotatably mounted on said base in close proximity to said ring gear;
    a plurality of receptacles rotatably carried on said hub about its edge marginal region;
    a hanger assembly carried on said hub member extending outwardly to the edge of said annular base;
    a plurality of food carrying skewers removably carried between said hanger assembly and said receptacles over said firebed;
    means operatively coupling said receptacles to said ring gear whereby rotary movement of said hub relative to said base rotates each of said receptacles and said skewers about their own central longitudinal axis as the hub member revolves about its central vertical axis; and
    means carried on said base for revolving said hub member.

4. A cooking apparatus comprising:
    an annular hollow base;
    a circular wall secured in said base;
    an annular firebed disposed on said base adjacent the periphery of said circular wall;
    a ring gear secured to said base within said circular wall;
    a hub member rotatably mounted on said base co-axial with said ring gear and in close proximity thereto;
    a plurality of receptacles rotatably carried on said hub about its edge marginal region and radially extending outwardly therefrom;
    a cantilevered hanger assembly carried on said hub member extending outwardly over said firebed to the edge of said annular base;
    a plurality of food carrying skewers rotatably and removably carried between said hanger assembly and said receptacles over said firebed responsive to rotation of said hub member;
    spur gear means operatively coupling said receptacles to said ring gear whereby rotary movement of said hub relative to said base rotates each of said receptacles and said skewers about their own central longitudinal axis as the hub member revolves about its central vertical axis; and
    motor means carried on said base for revolving said hub member.

5. A cooking apparatus comprising:
    a circular base having an outer up-turned wall and an inner circular wall;
    said outer wall and said inner wall defining a firebed area disposed between said walls;
    a circular hub having a downwardly extending side wall terminating in close proximity to the edge of said inner wall;
    a ring gear fixed to said base within said hub side wall;
    said hub being rotatably mounted on said ring gear and co-axially disposed with respect to said ring gear and said base;
    a plurality of shafts rotatably carried by said hub side wall;
    stop means secured to each of said shafts and abutting said hub side wall to prevent linear displacement of said shafts with respect to said hub side wall;
    a receptacle secured to one end of each of said shafts;
    a spur gear coupled to the other end of each of said shafts and in meshing engagement with said ring gear;
    a hanger assembly fixed to said hub radially extending over said firebed area and having a ring suspended therefrom adjacent the edge of said base outer wall;
    a plurality of food carrying skewers having one end of each of said skewers removably carried by each of said receptacles and the other end of each of said skewers supported on said hanger assembly ring so said skewers lie above said firebed area; and
    motor means fixed to said base and operatively coupled to said hub to rotate said hub about said ring gear so that said skewers travel in a horizontal plane over said firebed area and so that said receptacle carrying shafts are rotated via said spur gears in meshing engagement with said ring gear to rotate said skewers on said hanger assembly ring along their central longitudinal axes as said skewers travel in said horizontal plane.

6. The invention as defined in claim 5 including:
a bearing disposed between said hub and said ring gear; and
a housing supported on said base for enclosing said motor means and fixed to said ring gear to hold said ring gear stationary with respect to said base.

7. The invention as defined in claim 6 wherein:
each of said skewers has a rounded portion rotatably engageable with said hanger assembly ring.

8. An improved cooking apparatus comprising: a hollow base having an annular heating area, a hub member within said heating area mounted on said base for rotation about a substantially vertical axis; means for rotating said hub member; annular reaction means adjacent said hub member and fixedly supported on said base; plural radially extending shaft means carried by said hub member having socket means at their outer ends and including means engaging said reaction means for rotating said shaft means upon orbiting motion of said shaft means as carried by said hub as said hub rotates; skewers extending radially over said annular heating area, said skewers having their inner ends in said socket means, and ring means concentric with said reaction means outwardly of said annular heating area for supporting the outer ends of said skewers, said ring means being in substantially the same horizontal plane as said socket means.

9. An improved cooking apparatus comprising: a hollow base having an annular heating area, a hub member within said heating area mounted on said base for rotation about a substantially vertical axis; means for rotating said hub member; said rotating means being within the center portion of said annular heating area, annular reaction means adjacent said hub member and fixedly supported on said base; plural radially extending shaft means carried by said hub member having socket means at their outer ends and including means engaging said reaction means for rotating said shaft means upon orbiting motion of said shaft means as carried by said hub as said hub rotates; skewers extending radially over said annular heating area, said skewers having their inner ends in said socket means, and ring means concentric with said reaction means outwardly of said annular heating area for supporting the outer ends of said skewers, said ring means being in substantially the same horizontal plane as said socket means.

References Cited by the Examiner
UNITED STATES PATENTS

| 1,111,870 | 9/1914 | Spurgeon. |
| 1,731,743 | 10/1929 | Harrison. |
| 1,838,454 | 12/1931 | Guffey _____ 99—421 |
| 2,040,016 | 5/1936 | Sanders. |
| 2,517,360 | 8/1950 | Singer. |

WALTER A. SCHEEL, *Primary Examiner.*

J. M. NEARY, *Assistant Examiner.*